(12) United States Patent
Dahlman et al.

(10) Patent No.: US 9,532,355 B2
(45) Date of Patent: *Dec. 27, 2016

(54) TRANSMISSION OF SYSTEM INFORMATION ON A DOWNLINK SHARED CHANNEL

(71) Applicant: Telefonaktiebolaget LM Ericsson (PUBL), Stockholm (SE)

(72) Inventors: Erik Dahlman, Bromma (SE); Vera Vukajlovic Kenehan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,287

(22) Filed: Mar. 5, 2015

(65) Prior Publication Data
US 2015/0181600 A1   Jun. 25, 2015

Related U.S. Application Data

(63) Continuation of application No. 12/664,347, filed as application No. PCT/SE2008/050407 on Apr. 10, 2008, now Pat. No. 8,995,357.
(Continued)

(51) Int. Cl.
*H04W 72/04* (2009.01)
*H04W 48/12* (2009.01)

(52) U.S. Cl.
CPC ......... *H04W 72/0446* (2013.01); *H04W 48/12* (2013.01)

(58) Field of Classification Search
CPC ... H04L 1/08; H04L 2001/0093; H04W 48/12; H04W 72/0446
See application file for complete search history.

(56) References Cited

U.S. PATENT DOCUMENTS 7,675,852 B1 * 3/2010 Arundale ........... H04B 7/18506
370/229
7,680,507 B2   3/2010 Cheng et al.
(Continued)

FOREIGN PATENT DOCUMENTS

EP          1799003 A1    6/2007
JP       2006136023 A    5/2006
(Continued)

OTHER PUBLICATIONS

Samsung. "Draft text proposal capturing agreements on system information." 3GPP TSG-RAN2 Meeting #58, Tdoc R2-072205, Kobe, Japan, May 7-11, 2007, pp. 1-8.*
(Continued)

*Primary Examiner* — Siming Liu
(74) *Attorney, Agent, or Firm* — Coats & Bennett, P.L.L.C.

(57) ABSTRACT

In one embodiment, a method of transmitting system information on a downlink shared channel structured as successive subframes includes transmitting (400-416) system information in regularly occurring time windows, each time window spanning some number of successive subframes. The method further includes indicating (406/408) to receiving user equipment (120) which subframes within a given time window carry system information. The method and variations of it are applied, for example, to the transmission of dynamic system information on the downlink shared channel or other downlink channel in a 3GPP E-UTRA wireless communication network (100).

36 Claims, 6 Drawing Sheets

Related U.S. Application Data

(60) Provisional application No. 60/944,628, filed on Jun. 18, 2007.

(56) References Cited

U.S. PATENT DOCUMENTS

| | | | |
|---|---|---|---|
| 8,995,357 B2* | 3/2015 | Dahlman | H04L 1/08 370/311 |
| 2003/0133431 A1 | 7/2003 | Rudolf | |
| 2004/0219917 A1* | 11/2004 | Love | H04L 1/1671 455/436 |
| 2006/0034245 A1 | 2/2006 | Nguyen | |
| 2007/0217362 A1* | 9/2007 | Kashima | H04W 72/04 370/330 |
| 2008/0225765 A1* | 9/2008 | Marinier | H04L 1/1841 370/310 |
| 2008/0225823 A1 | 9/2008 | Tenny | |
| 2009/0131057 A1* | 5/2009 | Dimou | H04W 16/02 455/436 |
| 2009/0303939 A1 | 12/2009 | Umesh et al. | |
| 2010/0167750 A1 | 7/2010 | Lee et al. | |

FOREIGN PATENT DOCUMENTS

| | | |
|---|---|---|
| JP | 2009512391 A | 3/2009 |
| WO | 2007052917 A1 | 5/2007 |
| WO | 2007073079 A1 | 6/2007 |

OTHER PUBLICATIONS

Samsung. "System information scheduling and change notification." 3GPP TSG-RAN2 Meeting #58, Tdoc R2-071912, Kobe, Japan, May 7-11, 2007, pp. 1-6.*

Ericsson. "Transmission of dynamic system information." TSG-RAN2 #58bis, R2-072543, Orlando, FL, US, Jun. 25-29, 2007, pp. 1-4.

Ericsson. "Transmission of dynamic system information." 3GPP TSG-RAN2 Ad-hoc Meeting, Tdoc R2-075559, Vienna, Austria, Dec. 13-14, 2007, pp. 1-4.

3rd Generation Partnership Project. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)." 3GPP TS 36.300, V8.0.0, Mar. 2007, Sophia Antipolis Valbonne, France, pp. 1-82.

* cited by examiner

TRANSMISSION OF SYSTEM INFORMATION ON A DOWNLINK SHARED CHANNEL

RELATED APPLICATION

The present application is a continuation of U.S. patent application Ser. No. 12/664,347, which was filed on Dec. 11, 2009, which claims priority to PCT/SE2008/050407, which was filed on Apr. 10, 2008, which claims priority to U.S. Provisional Patent Application No. 60/944,628, which was filed on Jun. 18, 2007, all of which are incorporated by reference herein in their entirety.

TECHNICAL FIELD

The present invention generally relates to wireless communication networks, and particularly relates to the transmission of system information to user equipment (UE) operating in such networks, such as the transmission of system information by radio base stations in a wireless communication network configured according to 3GPP E-UTRA (evolved Universal Terrestrial Radio Access) standards, also referred to as 3GPP LTE (Long Term Evolution).

BACKGROUND

In the 3GPP LTE, downlink user-data transmission is carried out on the Downlink Shared Channel (DL-SCH) transport channel. In LTE, the time dimension is divided into radio frames of length 10 ms, where each radio frame consists of 10 subframes, each of length 1 ms corresponding to 14 OFDM (orthogonal frequency-division multiplexing) symbols. Each subframe consists of two slots, each of length 0.5 ms or seven OFDM symbols. Note that, in case of Time Division Duplex (TDD), only a subset of the subframes of one frame is available for downlink transmission. On the other hand, in case of Frequency Division Duplex (FDD), all subframes on a downlink carrier are available for downlink transmission.

In LTE, the overall time/frequency-domain physical resource is divided into resource blocks, where each resource block consists of twelve OFDM subcarriers during one slot. DL-SCH transmission to a UE is carried out using a set of such resource blocks during one subframe. Layer 1/Layer 2 (L1/L2) control signaling, also known as the Physical Downlink Control Channel (PDCCH), is transmitted at the beginning of each subframe. The L1/L2 control channel is typically used to inform a UE about various items. For example, the L1/L2 control channel may identify whether the DL-SCH carries data to the UE in the given subframe. More specifically, the L1/L2 control channel then includes the RNTI (Radio Network Temporary Identifier) associated with the UE for which the DL-SCH carries data in the given subframe. The L1/L2 control channel then also identifies the physical resource, more specifically the specific set of resource blocks that is used for the DL-SCH transmission to the specific UE in the given subframe. Moreover, the L1/L2 control channel then identifies the transport format (e.g. the modulation scheme and coding rate) used for DL-SCH transmission to the specific UE in the given subframe. Separate DL-SCH transmissions, using different physical resources (different resource blocks), can be carried out to different UEs during the same subframe. In this case there are multiple L1/L2 control channels, one for each UE that is to receive DL-SCH transmission in the given subframe.

In addition to user data, system information is also transmitted on the downlink within each cell. The system information may, e.g., include: public Land Mobile Network (PLMN) identity/identities, identifying the operator(s) to which the cell "belongs"; Neighbor-cell list, i.e. a list of the cells that are neighbors to the current cell; and different parameters used by the user terminal when accessing the system, e.g. random-access parameters and cell-access restrictions. The system information can be divided into two parts, one part being fixed and the other part being dynamic. The fixed part of the system information is transmitted on a pre-determined physical resource, i.e. a specific set of OFDM subcarriers during a specific time interval, using a pre-determined transport format. There is thus no flexibility in the amount of information in the fixed part of the system information. There is also no flexibility in the transmission structure (the physical resource and the transport format) used for the fixed part of the system information. In LTE, the fixed part of the system information is transmitted using the BCH (broadcast control channel) transport channel. Furthermore, for LTE it is currently assumed that the BCH is transmitted in the six centre resource blocks in subframe #0 of each frame.

The dynamic part of the system information is assumed to be transmitted using the DL-SCH, or at least a DL-SCH-like transport channel, similar to normal data transmission as described above. New UEs continuously "enter" the cell, either entering from a neighbor cell, due to power-on, or upon return from out-out-service, and the UEs must quickly acquire the system information. Thus the system information (both the fixed part on the BCH and the dynamic part on the DL-SCH or a DL-SCH-like channel) should be repeated regularly.

As an example, in LTE the fixed part of the system information (transmitted using the BCH) is assumed to be repeated every 40 ms. Also the dynamic part of the system information should be repeated more or less regularly. However, different portions of the dynamic part of the system information are more or less time critical, in the sense of how quickly the UE must acquire it, and thus need to be repeated more or less often. This can be described so that the dynamic part of the system information is divided into different so-called scheduling units, also referred to as System Information Messages. In general, information corresponding to scheduling unit number n should be repeated more often than information corresponding to scheduling unit number n+1. As an example, scheduling unit #1 (SU-1) may be repeated (approximately) once every 80 ms, scheduling unit #2 (SU-2) may be repeated (approximately) once every 160 ms, scheduling unit #3 (SU-3) may be repeated (approximately) once every 320 ms, etc.

SUMMARY

The invention described below allows for transmission of the dynamic part of the system information fulfilling these requirements and desirable properties while, at the same time, allowing for low UE complexity. One aspect of the teachings presented herein is to transmit system information in regularly occurring (system information) windows, with specific RNTIs indicating the presence of system information in a subframe, and with another specific RNTI indicating the end of system information transmission. This enables UEs to stop receiving, demodulating and decoding subframes when no more system information is expected during the current window.

In one embodiment, a method of transmitting system information on a downlink shared channel structured as successive subframes includes transmitting system information in regularly occurring time windows, each time window spanning some number of successive subframes. The method further includes indicating to receiving user equipment which subframes within a given time window carry system information.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
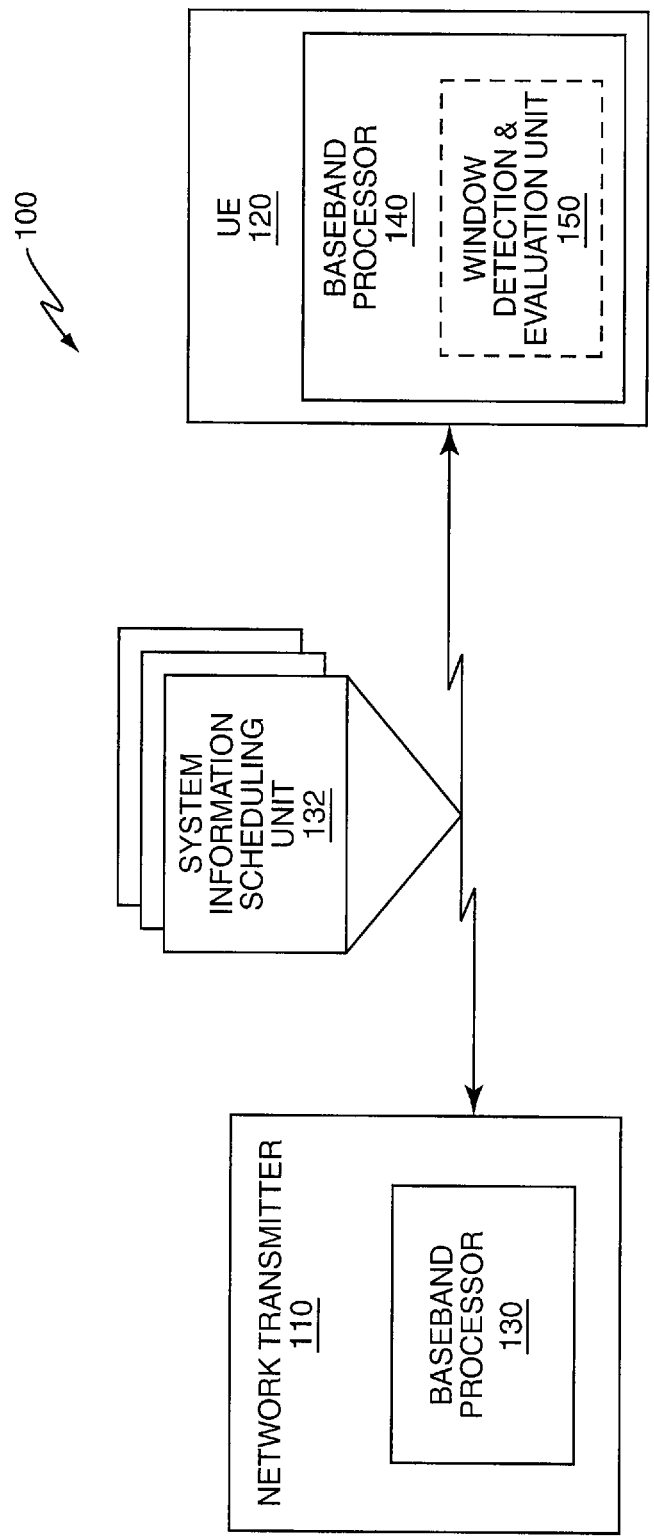
FIG. 1 is a block diagram of an embodiment of a wireless network that overlays or otherwise defines a recurring sequence of time windows for the transmission of dynamic system information using subframes falling within the defined time windows.
Figure 2:
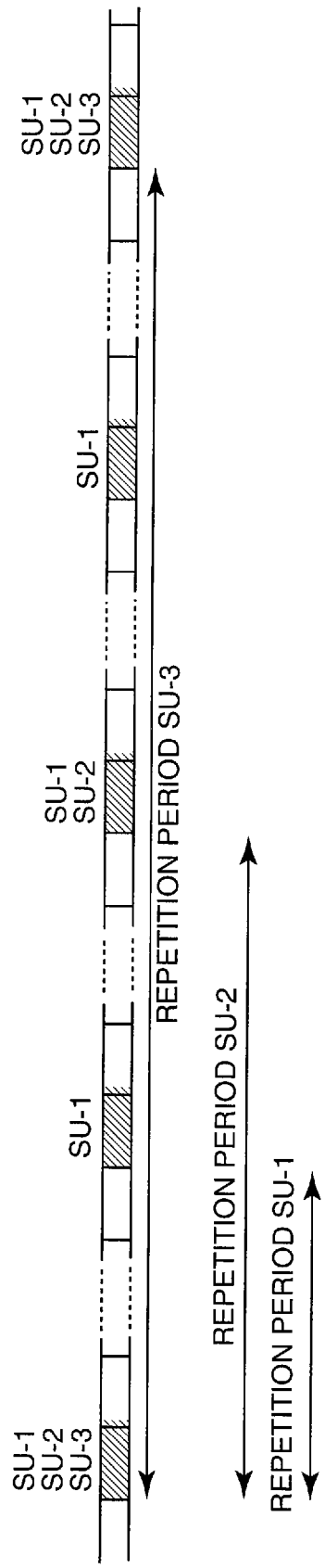
FIG. 2 is a diagram of an embodiment of different system-information time windows having different repetition periods.

FIG. 1 illustrates an embodiment of a wireless network 100 including one or more network transmitters 110 such as a radio base station which services one or more UEs 120. The network transmitter 110 includes a baseband processor 130 for generating one or more scheduling units 132 (also referred to as System Information Messages) including dynamic parts of the system information. The network transmitter 110 sends the scheduling units 132 to the UE 120 using different system-information windows. In one embodiment, the system-information windows occur with a period corresponding to the repetition period of the most frequently occurring scheduling unit 132 as shown in FIG. 2 where "SU-n" refers to the nth scheduling unit 132. System information corresponding to the most frequently occurring scheduling unit 132 is transmitted within each system-information window while less frequently-occurring scheduling units 132 are transmitted only within a sub-set of the system-information windows, where system information is shown as a shaded area in FIG. 2. For illustrative purposes only, system information corresponding to a second one of the scheduling units 132 could be transmitted within every second window, system information corresponding to a third one of the scheduling units 132 could be transmitted within every fourth window, and so on.

In one embodiment, the transmission timing corresponding to each scheduling unit 132 can be pre-specified when a limited amount of transmission periods are employed by the network 100. In another embodiment, the window transmission timing can be signaled to the UE 120, e.g. when more specific values for transmitted scheduling units 132 are specified. Either way, a variable window size can be used if the amount of system information is not the same in each window. In one embodiment, the window size is increased when system information from additional scheduling units 132 is transmitted.

Figure 3:
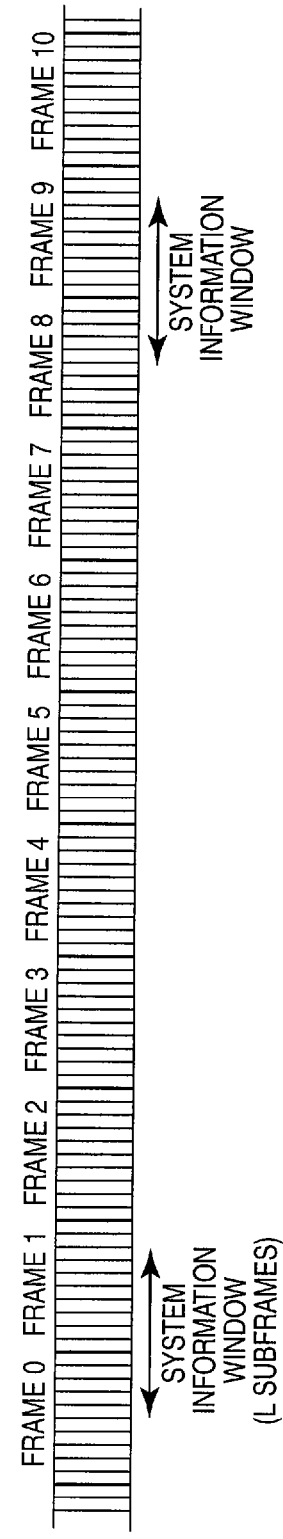
FIG. 3 is a diagram of an embodiment of overlaying or otherwise defining a recurring sequence of time windows for the transmission of dynamic system information using subframes falling within the defined time windows.

FIG. 3 illustrates one embodiment of transmitting the dynamic (possibly changing) system information within regularly occurring windows with well-defined starting points (specific subframes) and of a certain size in number of (consecutive) subframes. In the illustration, the system-information windows, more generally regarded as recurring time windows defined for the transmission of system information, start at subframe #5 of the frame with frame number 8*k and have a size of 13 subframes. The network transmitter 110 only transmits the dynamic part of the system information within these windows. Moreover, the window occurs (is repeated) often enough to fulfill the repetition rate of the most often repeated system information (in LTE terminology, system information corresponding to the first scheduling unit 132, as described above).

In one or more embodiments, within each recurring time window, the transmission of system information is carried out similar to the transmission of user data on DL-SCH (dynamic resource and transport format with signaling on L1/L2 control channel), with some exceptions. Instead of using an RNTI of a specific UE 120, a specific System-Information RNTI (SI-RNTI), indicating that system information to be read by all UEs 120 is being transmitted, is included in the corresponding L1/L2 control signaling. Also, for the last piece of system information to be transmitted within the window, the SI-RNTI is replaced with an End-of-System-Information RNTI (ESI-RNTI). The reception of an ESI-RNTI informs the UE 120 that no more system information is transmitted within the window. The UE 120 can stop demodulating and decoding the L1/L2 control channel when there is no more system information to be transmitted in the window, thus improving UE power-saving performance.

Moreover, the system information does not have to be transmitted in consecutive subframes. This way, the network transmitter 110 can dynamically avoid transmitting system information in certain subframes when a more pressing need for subframes arises, e.g., when a subframe is needed for high priority downlink data transmission or for uplink transmission in case of TDD. In addition, the set of subframes in which system information is actually transmitted does not have to be the same between consecutive windows. Furthermore, the network transmitter 110 can dynamically vary the number of subframes used to carry system information without prior knowledge of the UE 120 (i.e., prior to the UE 120 reading the L1/L2 control channel).

As non-limiting examples, the teachings presented herein for transmitting system information yields several desirable properties. For example, there are several requirements and desired properties for the transmission of the dynamic part of the system information. From a UE power-consumption point of-view, it is desirable to transmit the different parts of the system information as close in time as possible to each other, in the ideal case in a set of consecutive subframes.

This enables the UE 120 to receive the maximum amount of system information during a minimum reception time, reducing UE reception time and UE power consumption.

The teachings herein also allow system information to be transmitted in recurring time windows, where the particular subframes within each window used for carrying system information are selectable. If current conditions, e.g., competing transmission priorities permit, the system information can be transmitted in a contiguous set of subframes within the time window.

It is also desirable to have flexibility in terms of exactly where the system information is transmitted, i.e., exactly which set of subframes within a given time window carries the system information. Some subframes, depending on the situation, may not be available for transmitting system information. For example, some TDD subframes may not be available for downlink transmission. In another example, for latency reasons there may, in some situations, be a benefit to not having too many consecutive subframes used for transmission of system information, thus making them unavailable for downlink user data transmission. As such, it is also desirable to dynamically (with low delay) decide in exactly what subframes the system information is to be transmitted.

Further, it is desirable to have flexibility in the rate by which different parts of the system information is repeated. In this way, a higher repetition rate (shorter repetition period) can be used, e.g. in the case of wider overall transmission bandwidth, when the overhead of the system-information transmission is less of a concern. It is desirable to have flexibility in the number of subframes used to transmit the system information. As an example, in case of smaller overall bandwidth or larger cells, more subframes may be needed to transmit a given set of system information. Moreover, the amount of system information, e.g. neighbor lists and PLMN lists may be of different sizes for different cells.

Figure 4:
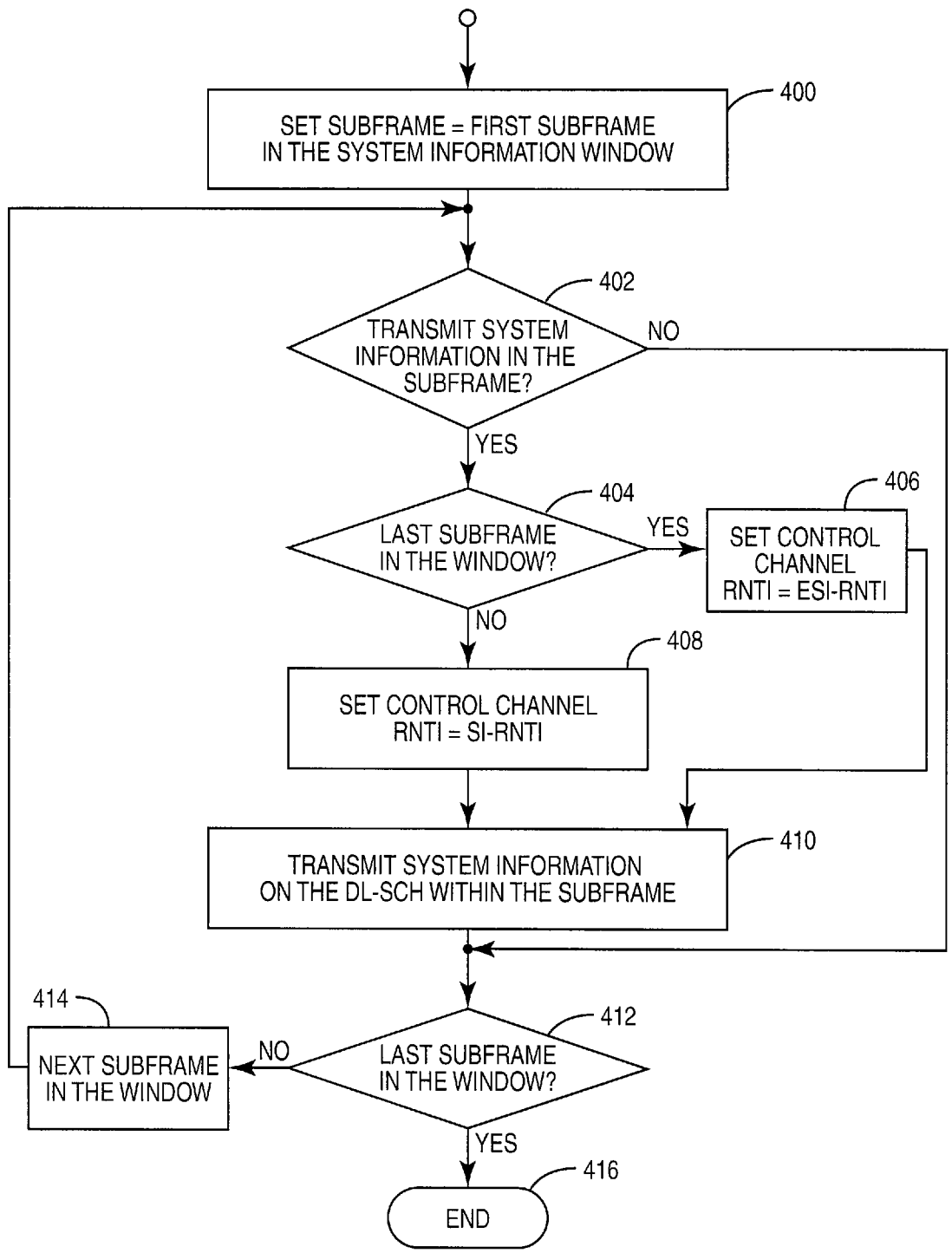
FIG. 4 is a flow diagram of an embodiment of program logic for overlaying or otherwise defining a recurring sequence of time windows for the transmission of dynamic system information using subframes falling within the defined time windows.

The teachings presented herein provide for methods and apparatuses where system information is transmitted within recurring time windows, but with flexible selection of which subframes within those windows are used to carry system information. FIG. 4 illustrates one embodiment of program logic for transmitting system information from the network transmitter 110 to the UE 120. According to this embodiment, the baseband processor 130 included in the network transmitter 110 initializes the first subframe in the system-information window (Step 400). The baseband processor 130 then determines whether the current subframe is to be used for transmission of system information (Step 402). If so, the baseband processor 130 determines whether the current subframe is the last subframe in the window (Step 404). If the current subframe is the last subframe, the RNTI of the L1/L2 control channel is set to ESI-RNTI for indicating to the UE 120 that the subframe is the last subframe in the window containing system information. (Step 406). Otherwise, the control channel RNTI is set to SI-RNTI for indicating to the UE 120 that the subframe contains system information, but is not the last subframe. (Step 408). The corresponding system information is transmitted on the DL-SCH within the current subframe (Step 410). The baseband processor 130 determines whether the last window subframe has been transmitted (Step 412). If not, Steps 402-412 are repeated for the next subframe within the window. The system information transmission process ends when the last subframe is transmitted (Step 416).

Figure 5:
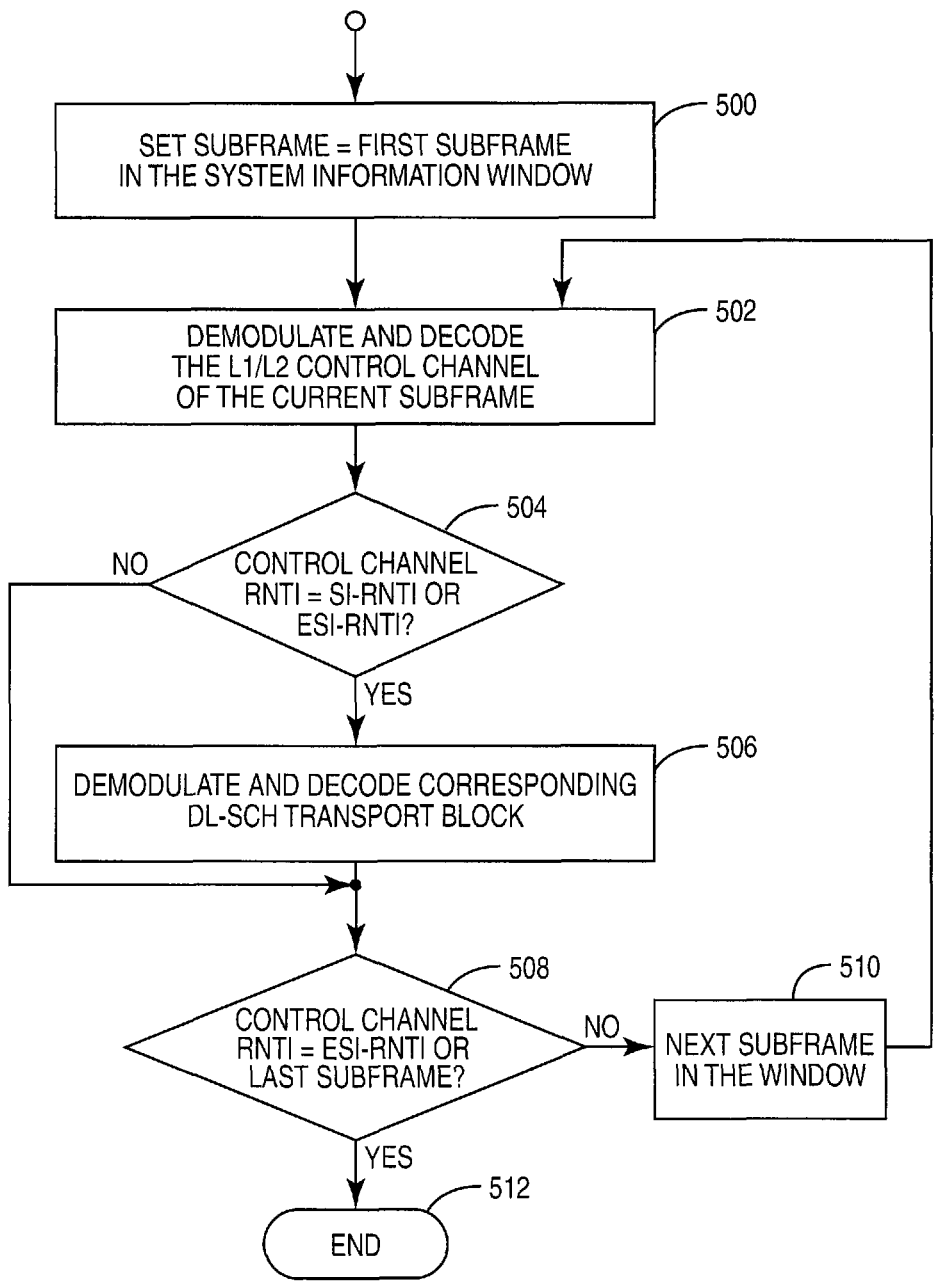
FIG. 5 is a flow diagram of an embodiment of program logic for processing recurring system-information time windows containing dynamic system information included in subframes falling within the defined time windows.

FIG. 5 illustrates one embodiment of program logic carried out by the UE 120 for processing the system information transmitted by the network transmitter 110. According to this embodiment, the UE 120 includes a baseband processor 140 for demodulating and decoding received subframes. A window detection and evaluation unit 150 included in or associated with the baseband processor 140 begins the window reception process by initializing the first subframe received within the window (Step 500). The baseband processor 150 then demodulates and decodes the L1/L2 control channel of the current subframe (Step 502). The window detection and evaluation unit 150 determines whether either SI-RNTI or ESI-RNTI is detected for the current subframe (Step 504). If so, the baseband processor 140 demodulates and decodes the corresponding DL-SCH transport block to retrieve the system information provided therewith (Step 506). The window detection and evaluation unit 150 then determines whether the current subframe is the last subframe in the window or the last subframe containing system information, e.g., whether the RNTI of the control channel is ESI-RNTI (Step 508). If neither condition exists, Steps 502-508 are repeated for the next subframe within the window (Step 510). The baseband processor 140 stops demodulating and decoding DL-SCH transport blocks when either the last subframe or ESI-RNTI is detected, indicating no more system information is forthcoming (Step 512). Thus, the UE 120 demodulates and decodes the control channel starting with the first subframe in the system information window and checks for specific system information RNTIs until either the ESI-RNTI is detected or the last window subframe is received.

Figure 6:
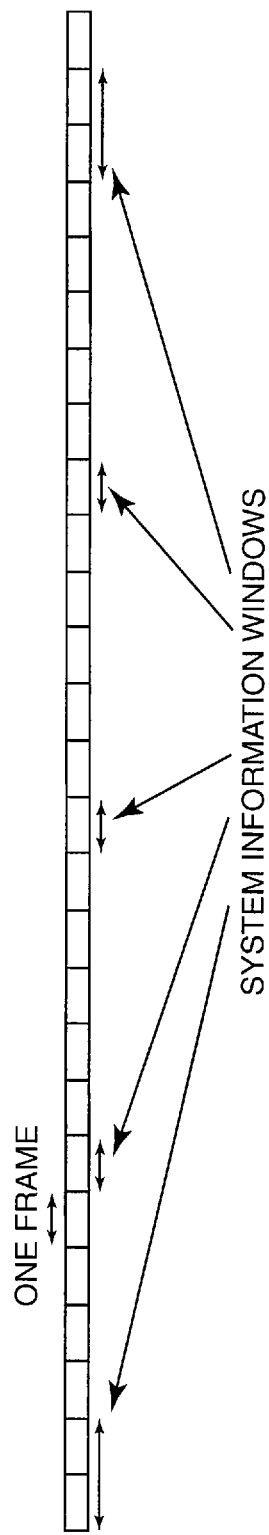
FIG. 6 is a diagram of an embodiment of variably sized recurring system-information time windows for the transmission of system information.

As discussed above, some parts of the system information (corresponding to the scheduling units 132) may not need to be repeated as often as some other parts of the system information, implying that certain windows will include more data (more scheduling units 132) than other windows. Thus, the window size may be of varying length, with a longer window at the time instances where more system information (more scheduling units 132) is to be transmitted. FIG. 6 provides an illustration of a variable-length window embodiment.

Note that the window size can be specified in either the radio-access specification or be configurable. In case of a configurable window size, the UE 120 can use a default (large) window size before it is informed (via the system information) about the actual window size. Moreover, the RNTI may indicate more than just system information such as more details about the system information. In one embodiment, several different SI-RNTIs could be used, e.g., SI-RNTI1, SI-RNTI2, SI-RNTI3, . . . , with corresponding multiple ESI-RNTIs, e.g., ESI-RNTI1, ESI-RNTI2, ESI-RNTI3, etc.

Figure 7:
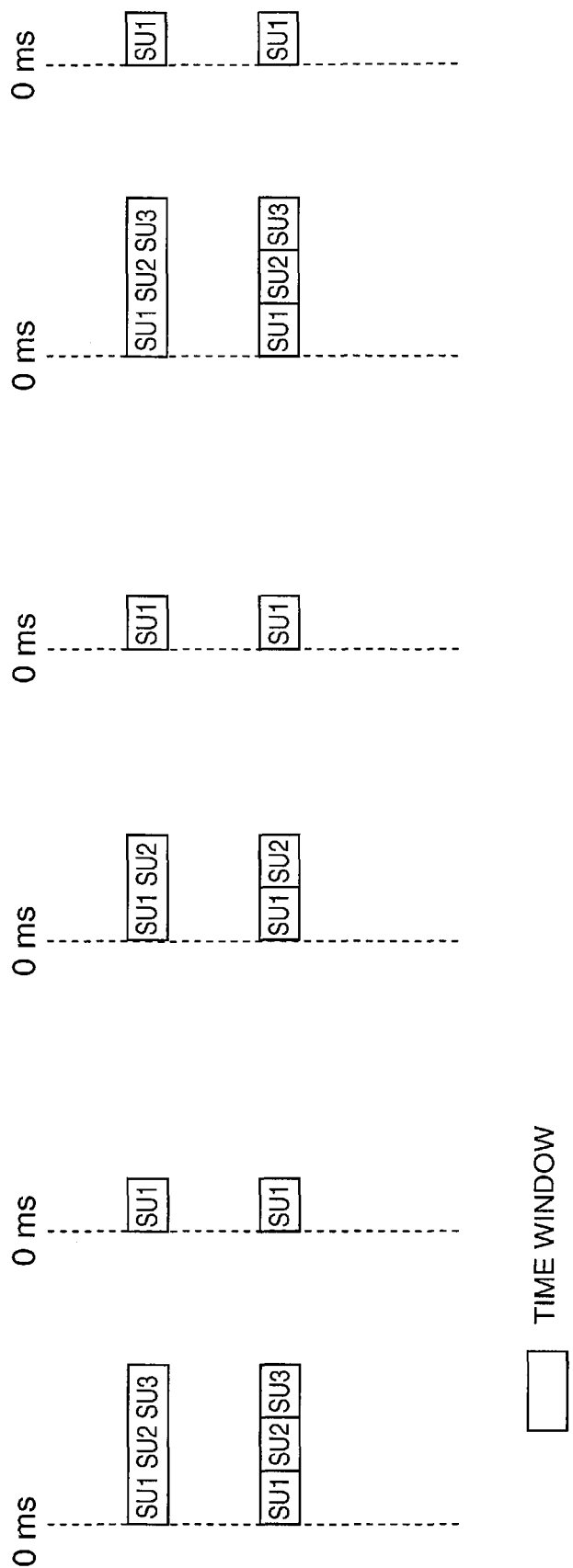
FIG. 7 is a diagram of an embodiment of different system-information time windows.

In one embodiment, the scheduling units 132 transmitted at the same time use the same system-information window as shown in the upper part of FIG. 7. Alternatively, the scheduling units 132 are transmitted using different system-information windows as shown in the lower part of FIG. 7. In either embodiment, system information is transmitted in regularly occurring system-information windows, with specific RNTIs indicating the presence of system information in a subframe, and with another specific RNTI indicating the end of system information transmission.

Of course, other variations are contemplated. Thus, the foregoing description and the accompanying drawings represent non-limiting examples of the methods and apparatus taught herein for the transmission of system information. As such, the present invention is not limited by the foregoing description and accompanying drawings. Instead, the present invention is limited only by the following claims and their legal equivalents.

What is claimed is:

1. A method of transmitting system information on a downlink shared channel of a wireless communication network comprising:
 transmitting system information on the downlink shared channel in recurring time windows, each time window spanning one or more subframes,
 wherein a set of subframes out of the one or more subframes within a time window is used for carrying the system information; and
 using an indicator in each subframe in the set of subframes that is used for carrying the system information to indicate to receiving user equipment that the subframe carries system information, wherein the indicator is a System Information Radio Network Temporary Identifier (SI-RNTI).

2. The method of claim 1, wherein the set of subframes within the time window is a contiguous set of subframes within the time window.

3. The method of claim 1, wherein the set of subframes within the time window is a non-contiguous set of subframes within the time window.

4. The method of claim 1, wherein the set of subframes within the time window used for carrying the system information is dynamically selected in view of competing transmission priorities associated with other control or data signaling.

5. The method of claim 1, wherein using an indicator in each subframe in the set of subframes that is used for carrying the system information to indicate to receiving user equipment that the subframe carries system information includes using an end-of-system-information indicator in a last subframe of the time window that carries system information.

6. The method of claim 1, further comprising varying window sizes of the recurring time windows.

7. The method of claim 1, further comprising dynamically configuring a window size for the recurring time windows.

8. The method of claim 1, wherein using an indicator in each subframe in the set of subframes that is used for carrying the system information to indicate to receiving user equipment that the subframe carries system information includes using different indicators corresponding to different types of system information, such that the indicator used for a particular subframe indicates the type of system information carried in that subframe.

9. The method of claim 1, wherein the wireless communication network is an Orthogonal Frequency Division Multiplexing (OFDM) based wireless communication network.

10. A network transmitter comprising a baseband processor configured to:
 generate system information for transmission on a downlink shared channel in recurring time windows, each time window spanning one or more subframes, wherein a set of subframes out of the one or more subframes within a time window is used for carrying the system information; and
 use an indicator in each subframe in the set of subframes that is used for carrying the system information to indicate to receiving user equipment that the subframe carries system information, wherein the indicator is a System Information Radio Network Temporary Identifier (SI-RNTI).

11. The network transmitter of claim 10, wherein the network transmitter comprises a radio base station configured for operation in accordance with 3GPP E-UTRA standards.

12. The network transmitter of claim 10, wherein the network transmitter is configured for operation in an Orthogonal Frequency Division Multiplexing (OFDM) based wireless communication network.

13. A method of transmitting system information on a downlink shared channel structured as successive subframes, the method comprising:
 transmitting system information in regularly occurring time windows, each time window spanning some number of successive subframes; and
 indicating to receiving user equipment which subframes within the time windows carry system information, by using an indicator in each subframe within the time windows that carries system information.

14. The method of claim 13, further comprising dynamically selecting which subframes within the time windows are used for carrying system information.

15. The method of claim 13, wherein the indicator is a System Information Radio Network Temporary Identifier (SI-RNTI).

16. The method of claim 13, wherein the method is performed in an Orthogonal Frequency Division Multiplexing (OFDM) based wireless communication network.

17. A method for a user equipment to receive system information from a supporting wireless communication network, the method comprising:
 monitoring, by the user equipment, at least one subframe within a time window for an indication of presence of system information in the at least one subframe, the time window being one of a set of recurring time windows used for transmission of the system information, each of said recurring time windows spanning a number of subframes, and said indication being present in each subframe where system information is present;
 and reading, by the user equipment, system information from the at least one subframe when said indication is present in the at least one subframe, wherein the indication is a System Information Radio Network Temporary Identifier (SI-RNTI).

18. The method of claim 17, further comprising recognizing an end-of-system-information indicator in a signal received within the time window and terminating monitoring within the time window in response.

19. The method of claim 17, further comprising adapting to changing or configurable window sizes used for the time window.

20. The method of claim 17, further comprising storing a default window size for monitoring for system information transmissions.

21. The method of claim 20, further comprising monitoring for system information transmissions based on a specified window size indicated in received information rather than the default window size.

22. The method of claim 17, further comprising recognizing different types of system information based on recognizing different system information indicators in different subframes.

23. The method of claim 17, wherein the wireless communication network is an Orthogonal Frequency Division Multiplexing (OFDM) based wireless communication network.

24. A user equipment comprising a baseband processor configured to:
 monitor at least one subframe within a time window for an indication of presence of system information in the at least one subframe, the time window being one of a set of recurring time windows used for transmission of the system information, each of said recurring time windows spanning a number of subframes, and said indication being present in each subframe where system information is present;

and read system information from the at least one subframe when said indication is present in the at least one subframe, wherein the indication is a System Information Radio Network Temporary Identifier (SI-RNTI).

25. The user equipment of claim 24, wherein the baseband processor is configured to recognize an end-of-system-information indicator in a subframe received within the time window and terminate monitoring within the time window in response.

26. The user equipment of claim 24, wherein the baseband processor is configured to adapt to changing or configurable window sizes used for the time window.

27. The user equipment of claim 24, wherein the baseband processor is configured to monitor for system information transmissions based on a specified window size indicated in received information rather than a default window size.

28. The user equipment of claim 24, wherein the baseband processor is configured to recognize different types of system information based on different system information indicators detected in different signal subframes.

29. The user equipment of claim 24, wherein the user equipment is configured for operation in an Orthogonal Frequency Division Multiplexing (OFDM) based wireless communication network.

30. A network transmitter for transmitting system information on a downlink shared channel structured as successive subframes, the network transmitter comprising a baseband processor configured to:

transmit system information in regularly occurring time windows, each time window spanning some number of successive subframes; and indicate to receiving user equipment which subframes within the time windows carry system information, by using an indicator in each subframe within the time windows that carries system information.

31. The network transmitter of claim 30, wherein the indicator is a System Information Radio Network Temporary Identifier (SI-RNTI).

32. The network transmitter of claim 30, wherein the network transmitter is configured for operation in an Orthogonal Frequency Division Multiplexing (OFDM) based wireless communication network.

33. A method for a user equipment to receive system information transmitted in recurring time windows from a supporting wireless communication network, the method comprising:

monitoring, by the user equipment, in a time window spanning a number of subframes, for an indication of presence of system information in a subframe within the time window, wherein said indication is a System Information Radio Network Temporary Identifier (SI-RNTI) that is present in the subframe if the subframe comprises system information; and reading, by the user equipment, system information from the subframe when the SI-RNTI is present in the subframe.

34. The method of claim 33, wherein the wireless communication network is an Orthogonal Frequency Division Multiplexing (OFDM) based wireless communication network.

35. A user equipment for receiving system information transmitted in recurring time windows from a supporting wireless communication network, the user equipment comprising a baseband processor configured to:

monitor in a time window spanning a number of subframes, for an indication of presence of system information in a subframe within the time window, wherein said indication is a System Information Radio Network Temporary Identifier (SI-RNTI) that is present in the subframe if the subframe comprises system information; and read system information from the subframe when the SI-RNTI is present in the subframe.

36. The user equipment of claim 35, wherein the wireless communication network is an Orthogonal Frequency Division Multiplexing (OFDM) based wireless communication network.

* * * * *

UNITED STATES PATENT AND TRADEMARK OFFICE
CERTIFICATE OF CORRECTION

PATENT NO. : 9,532,355 B2
APPLICATION NO. : 14/639287
DATED : December 27, 2016
INVENTOR(S) : Dahlman et al.

Page 1 of 1

It is certified that error appears in the above-identified patent and that said Letters Patent is hereby corrected as shown below:

On the Title Page

In Item (56), under "U.S. PATENT DOCUMENTS", in Column 2, Line 1, delete "Arundale" and insert -- Arundale et al. --, therefor.

On Page 2, in Item (56), under "U.S. PATENT DOCUMENTS", in Column 1, Line 1, delete "Dahlman" and insert -- Dahlman et al. --, therefor.

On Page 2, in Item (56), under "U.S. PATENT DOCUMENTS", in Column 1, Line 4, delete "Love" and insert -- Love et al. --, therefor.

On Page 2, in Item (56), under "U.S. PATENT DOCUMENTS", in Column 1, Line 7, delete "Kashima" and insert -- Kashima et al. --, therefor.

On Page 2, in Item (56), under "U.S. PATENT DOCUMENTS", in Column 1, Line 9, delete "Marinier" and insert -- Marinier et al. --, therefor.

In the Specification

In Column 1, Line 9, delete "2009," and insert -- 2009, now Pat. No. 8,995,357, --, therefor.

In Column 6, Line 7, delete "baseband processor 150" and insert -- baseband processor 140 --, therefor.

In the Claims

In Column 8, Line 41, in Claim 18, delete "signal" and insert -- subframe --, therefor.

In Column 9, Line 23, in Claim 28, delete "different signal" and insert -- different --, therefor.

Signed and Sealed this
Twenty-fifth Day of September, 2018

Andrei Iancu
*Director of the United States Patent and Trademark Office*